US009742901B2

(12) United States Patent
Ye et al.

(10) Patent No.: US 9,742,901 B2
(45) Date of Patent: Aug. 22, 2017

(54) METHOD, APPARATUS AND TERMINAL DEVICE FOR OBTAINING CALL LOG

(71) Applicant: TENCENT TECHNOLOGY (SHENZHEN) COMPANY LIMITED, Shenzhen, Guangdong (CN)

(72) Inventors: Liwei Ye, Shenzhen (CN); Bin Li, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 15/035,115

(22) PCT Filed: Nov. 5, 2014

(86) PCT No.: PCT/CN2014/090298
§ 371 (c)(1),
(2) Date: May 6, 2016

(87) PCT Pub. No.: WO2015/067169
PCT Pub. Date: May 14, 2015

(65) Prior Publication Data
US 2016/0286030 A1 Sep. 29, 2016

(30) Foreign Application Priority Data
Nov. 7, 2013 (CN) .......................... 2013 1 0549797

(51) Int. Cl.
*H04M 1/725* (2006.01)
(52) U.S. Cl.
CPC ... *H04M 1/72563* (2013.01); *H04M 1/72519* (2013.01); *H04M 2250/60* (2013.01)
(58) Field of Classification Search
CPC .................. H04M 1/72563; H04M 2250/60
(Continued)

(56) References Cited

U.S. PATENT DOCUMENTS 7,526,516 B1 * 4/2009 Pavlyushchik ....... G06F 21/554
8,340,719 B1 * 12/2012 Zands ............... H04M 1/72552
455/404.2

(Continued)

FOREIGN PATENT DOCUMENTS

CN 101370046 A 2/2009
CN 102323923 A 1/2012
(Continued)

OTHER PUBLICATIONS

International Search Report and Written Opinion of the ISA for PCT/CN2014/090298, ISA/CN, Haidian District, Beijing, mailed Feb. 13, 2015.

(Continued)

*Primary Examiner* — Kamran Afshar
*Assistant Examiner* — Nicole Louis-Fils
(74) *Attorney, Agent, or Firm* — Harness, Dickey & Pierce, P.L.C.

(57) ABSTRACT

Examples of the present disclosure provide a method, apparatus and terminal device for obtaining a call log of a terminal device. The method includes: when requesting for call log data of a terminal device, determining whether the terminal device is already in jailbreak; when the terminal device is not in jailbreak, from a call log database corresponding to an application program with a call function, obtaining call log data corresponding to the application program, and displaying the call log data through a User Interface (UI); and when the terminal device is in jailbreak, obtaining a full amount of call log data of the terminal device by a service program running background or a hook system interface, and displaying the full amount of call log data through a UI. According to the present disclosure, obtaining the call log data compatible with both the non
(Continued)

jailbreak terminal device and the jailbreak terminal device is achieved.

6 Claims, 5 Drawing Sheets

(58) Field of Classification Search
USPC .................. 455/418–420, 566; 370/486; 709/212–216
See application file for complete search history.

(56) References Cited

U.S. PATENT DOCUMENTS

| | | | |
|---|---|---|---|
| 8,387,077 B1* | 2/2013 | Getlin | G06F 9/54 |
| | | | 718/1 |
| 2006/0294592 A1* | 12/2006 | Polyakov | G06F 21/566 |
| | | | 726/24 |
| 2010/0207721 A1* | 8/2010 | Nakajima | G06F 21/552 |
| | | | 340/5.3 |
| 2013/0179403 A1 | 7/2013 | Kim et al. | |
| 2013/0191686 A1 | 7/2013 | Kim et al. | |
| 2013/0215881 A1 | 8/2013 | Dalton, Jr. et al. | |

FOREIGN PATENT DOCUMENTS

| | | |
|---|---|---|
| CN | 102567684 A | 7/2012 |
| CN | 102938789 A | 2/2013 |
| CN | 103064737 A | 4/2013 |
| CN | 103064764 A | 4/2013 |
| CN | 103197991 A | 7/2013 |
| CN | 103561176 A | 2/2014 |
| WO | WO-2015067169 A1 | 5/2015 |

OTHER PUBLICATIONS

Chinese Office Action for 201310549797.6 with concise explanation of relevance.

* cited by examiner

METHOD, APPARATUS AND TERMINAL DEVICE FOR OBTAINING CALL LOG

CROSS-REFERENCE TO RELATED APPLICATIONS

This application is a 371 National Phase application of PCT/CN2014/090298, filed on Nov. 5, 2014, which claims the benefit of and priority to Chinese Patent Application No. 201310549797.6, filed on Nov. 7, 2013, the disclosure of which is incorporated herein in its entirety by reference.

FIELD

The present disclosure relates to data processing technologies for a terminal, more particularly to a method, apparatus and terminal device for obtaining a call log.

BACKGROUND

Currently, most terminal devices, especially smart terminals (e.g., smart phone, tablet) have functions of making a call and answering a call. In order to know results of making a call and answering a call by a terminal device, a user generally reads call logs stored by the terminal device to make clear the results of making a call and answering a call by the terminal device. Hence, how to better read the call logs of the terminal device has been a technical research point for those skilled in the art.

With the popularity of operation systems, such as IOS, Windows Phone, up till now, there are generally two cases for the terminal device, i.e., jailbreak and non-jailbreak. The jailbreak means to unlock the operation authority of the user to enable the user to freely remove and write operation status of any areas in the terminal device, and to enable the user to define and install a non-official application program or an application program from a third party. About the non-jailbreak terminal device, a common application program installed by the terminal device has no enough authorities to obtain the call log resources of the system, and cannot obtain a full amount of call logs about the incoming call and the outgoing call. The common application program can only store the call logs outgoing from itself, and then save them in its database. The described common application program may be an application program with a call function, e.g., QQ contact.

SUMMARY

Examples of the present disclosure provide a method, apparatus and terminal device for obtaining a call log of a terminal device.

A method for obtaining a call log of a terminal device, comprising:

when requesting for call log data of a terminal device, determining whether the terminal device is already in jailbreak;

when the terminal device is not in jailbreak, from a call log database corresponding to an application program with a call function, obtaining call log data corresponding to the application program, and displaying the call log data through a User Interface (UI); and when the terminal device is in jailbreak, obtaining a full amount of call log data of the terminal device by a service program running background or a hook system interface, and displaying the full amount of call log data through a UI.

An apparatus for obtaining a call log of a terminal device, comprising:

a jailbreak determining module, configured to when requesting for call log data of a terminal device, determine whether the terminal device is already in jailbreak;

a first obtaining and displaying module, configured to when the terminal device is not in jailbreak, from a call log database corresponding to an application program with a call function, obtain call log data corresponding to the application program, and display the call log data through a User Interface (UI); and a second obtaining and displaying module, configured to when the terminal device is in jailbreak, obtain a full amount of call log data of the terminal device by a service program running background or a hook system interface, and display the full amount of call log data through a UI.

The present disclosure also provides a terminal device, including the above-described apparatus for obtaining a call log of the terminal device.

The present disclosure also provides another terminal device, comprising: a memory, and one or more programs stored in the memory and configured for execution by the one or more processors, the one or more programs including instructions to:

when requesting for call log data of a terminal device, determine whether the terminal device is already in jailbreak;

when the terminal device is not in jailbreak, from a call log database corresponding to an application program with a call function, obtain call log data corresponding to the application program, and display the call log data through a User Interface (UI); and when the terminal device is in jailbreak, obtain a full amount of call log data of the terminal device by a service program running background or a hook system interface, and display the full amount of call log data through a UI.

BRIEF DESCRIPTION OF THE DRAWINGS

For a better understanding of the present disclosure, accompanying drawings to be used in description of the examples will be simply introduced hereinafter. Obviously, the accompanying drawings to be described hereinafter are only some examples of the present invention. Those skilled in the art may obtain other drawings according to these accompanying drawings without creative labor.

DETAILED DESCRIPTION

Currently, there is no one method for obtaining a call log, which is compatible with both the jailbreak terminal device and the non-jailbreak terminal device. Existing methods for obtaining a call log of the terminal device are designed and implemented only for the non-jailbreak terminal device, of which technical solutions can only keep call logs outgoing from the application program, but cannot obtain the result that whether the call outgoing from the application program is got through and cannot obtain the turn-on time. Hence, the outgoing log in the call logs can only represent a state, but cannot fully present accurate information.

In order to make the object, technical solution, and merits of the present disclosure clearer, the present disclosure will be illustrated in detail hereinafter with reference to the accompanying drawings and specific examples. Obviously, the examples to be described hereinafter are only a part of examples in the present disclosure, but not all the examples. According to these examples, those skilled in the art may obtain other examples without creative labor, which all belong to the scope protected by the present disclosure.

Figure 1:
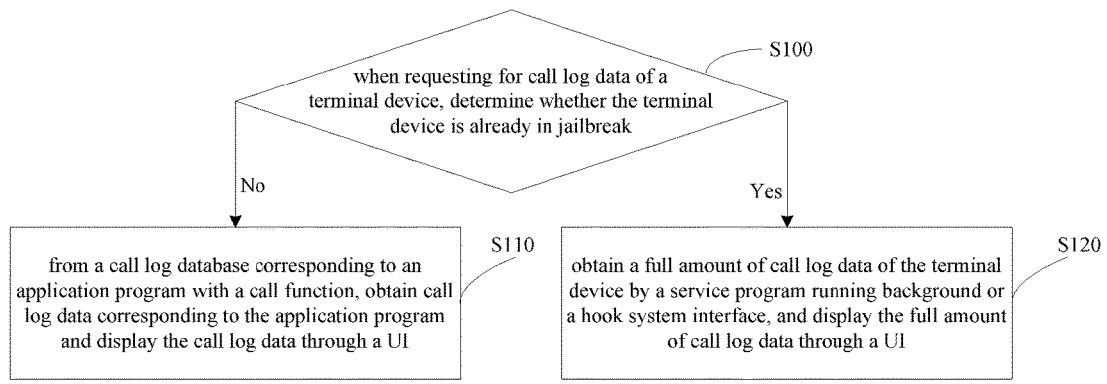
FIG. 1 is a flow diagram illustrating a method for obtaining a call log of a terminal device according to an example of the present disclosure.

FIG. 1 is a flow diagram illustrating a method for obtaining a call log of a terminal device according to an example of the present disclosure. As shown in FIG. 1, the method includes the following procedure.

In S100, when requesting for call log data of a terminal device, determine whether the terminal device is already in jailbreak; if no, perform S110; otherwise, perform S120.

Optionally, in the example of the present disclosure, a request for obtaining call log data may be sent from a User Interface (UI) layer to an adaptation layer so as to request for call log data of the terminal device. When it needs to display call log data of the terminal device in the UI layer, the UI layer may request for call log data from the adaptation layer. In implementation, in the example of the present disclosure, the UI layer may call an Application Programming Interface (API) provided by the adaptation layer outwards to request for call log data from the adaptation layer.

Optionally, in the example of the present disclosure, it may use the adaptation layer to determine whether the terminal device is already in jailbreak. With respect to a common jailbreak device, there is a file of "\system\cydia.app" available in the system files. Hence, in the example of the present disclosure, it may determine by the adaptation layer whether there is a file of "\system\cydia.app" available in the system files in the terminal device; if yes, determine that the terminal device is in jailbreak; otherwise, determine that the terminal device is not in jailbreak.

In S110, from a call log database corresponding to an application program with a call function, obtain call log data corresponding to the application program and display the call log data through a UI.

For the non-jailbreak terminal device, the application program with a call function installed by the terminal device can only store call logs outgoing from itself, and then save them in its database. In general, call log data of the application program with a call function is stored a SQLlite database under the directory where the application program is installed. Hence, for the non-jailbreak terminal device, in the example of the present disclosure, by the adaptation layer calling the SQLlite database of the application program with a call function, the call log data (e.g, data of incoming or outgoing call logs) corresponding to the application program is obtained from the SQLlite database, the obtained call log data is returned to the UI layer by the adaptation layer, and the call log data corresponding to the application program is displayed through the UI layer.

In S120, obtain a full amount of call log data of the terminal device by a service program running background or a hook system interface (one system mechanism provided by the operation system to replace "interruption" in DOS system), and display the full amount of call log data through a UI.

After jailbreak of the terminal device, it may use the adaptation layer directly through a service program running background or a hook system interface to obtain a full amount of call log data of the terminal device, and the full amount of call log data are returned to the UI layer by the adaptation layer, and the full amount of call log data are displayed through the UI layer.

According to the method for obtaining a call log of the terminal device provided by the present disclosure, for the non-jailbreak terminal device, from the call log database corresponding to the application program with a call function, the call log data corresponding to the application program is obtained, and the call log data is displayed through the UI layer. For the jailbreak terminal device, by a service program running background or a hook system interface, a full amount of call log data of the terminal device are obtained, and the full amount of call log data are displayed through the UI layer. In can be seen that obtaining the call log data compatible with both the non-jailbreak terminal device and the jailbreak terminal device can be achieved, and the problem that existing methods for obtaining a call log of the terminal device are only applied for the non-jailbreak terminal device and cannot be compatible with both the non-jailbreak terminal device and the jailbreak terminal device for obtaining a call log of the terminal device is solved.

For the jailbreak terminal device, when using the adaptation layer through a service program running background of the terminal device or a hook system interface to obtain call log data, in order to avoid a cotton feel or a white-screen problem, it may first from a call log database corresponding to an application program with a call function, obtain call log data corresponding to the application program by the adaptation layer, then obtain a full amount of call log data of the terminal device by the adaptation layer using a service program running background or a hook system interface, and store the full amount of call log data in the call log database; for the duplicate data, it may directly use the full amount of call log data to cover the duplicate data in the call log data stored originally in the call log database. It can be seen that, in the examples of the present disclosure, obtain data in the internal database of the application program with a call function at first, and then request for obtaining all the call log data by using the adaptation layer through a service program running background of the terminal device or a hook system interface; after obtaining all the call log data by using the adaptation layer, the obtained data is stored in the internal database of the application program with a call function as a cache of the call log data, and then update call log data by a UI.

The above-described processing may be applied for the case when firstly using the adaptation layer through a service program running background of the terminal device or a hook system interface to obtain call log data, or may also be applied for any cases when using the adaptation layer through a service program running background of the terminal device or a hook system interface to obtain call log data.

Optionally, when the adaptation layer using a service program running background to obtain a full amount of call log data of the terminal device, a request for obtaining call log data may be sent by the adaptation layer to the service program running background. The request may carry a timestamp corresponding to a previous request. If the current timestamp of the service program running background (the timestamp may be used to identify whether current call log data has been extracted) is same with the timestamp corresponding to a previous request, an indicator of call log data being unchanged may be returned to the adaptation layer, and it may not return the call log data to the adaptation layer; if the current timestamp of the service program running background is different from the timestamp corresponding to a previous request, the full amount of the call log data is obtained, and the current timestamp is returned to the adaptation layer.

Optionally, after the full amount of call log data is obtained by the adaptation layer, it may determine by the adaptation layer whether the obtained full amount of call log data is changed compared with the full amount of call log data obtained previously; if yes, store the full amount of call log data in the call log database; otherwise, not store the full amount of call log data in the call log database. Optionally, when the timestamp carried in the request is different from the current timestamp of the service program running background, it indicates that the call log data has been changed.

Optionally, in the example of the present disclosure, an application program and a service program running background may request and obtain data by a message port. The message port may be implemented by a socket.

Figure 2:
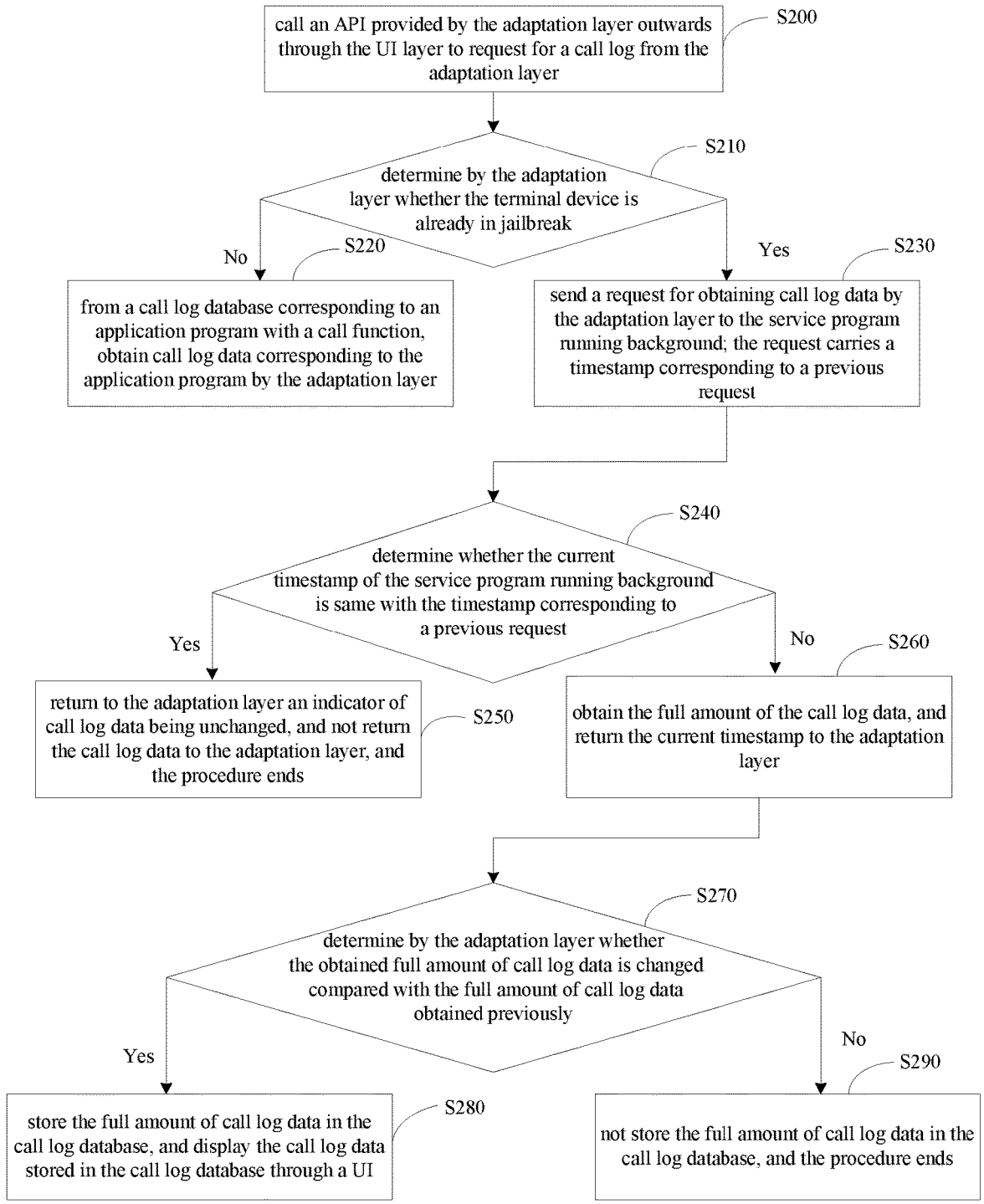
FIG. 2 is a flow diagram illustrating another method for obtaining a call log of a terminal device according to an example of the present disclosure.

FIG. 2 is a flow diagram illustrating another method for obtaining a call log of a terminal device according to an example of the present disclosure. As shown in FIG. 2, the method includes the following procedures.

In S200, call an API provided by the adaptation layer outwards through the UI layer to request for a call log from the adaptation layer.

In S210, determine by the adaptation layer whether the terminal device is already in jailbreak; if yes, perform S230; otherwise, perform S220.

In S220, from a call log database corresponding to an application program with a call function, obtain call log data corresponding to the application program by the adaptation layer.

In S230, send a request for obtaining call log data by the adaptation layer to the service program running background; the request carries a timestamp corresponding to a previous request.

In S240, determine whether the current timestamp of the service program running background is same with the timestamp corresponding to a previous request; if yes, perform S250; otherwise, perform S260.

In S250, return to the adaptation layer an indicator of call log data being unchanged, and not return the call log data to the adaptation layer, and the procedure ends.

In S260, obtain the full amount of the call log data, and return the current timestamp to the adaptation layer.

In S270, determine by the adaptation layer whether the obtained full amount of call log data is changed compared with the full amount of call log data obtained previously; if yes, perform S280; otherwise, perform S290.

In S280, store the full amount of call log data in the call log database, and display the call log data stored in the call log database through a UI.

In S290, not store the full amount of call log data in the call log database, and the procedure ends.

According to the method for obtaining a call log of the terminal device provided by the present disclosure, obtaining the call log data compatible with both the non-jailbreak terminal device and the jailbreak terminal device is achieved, and the call log data of the terminal device can be fully displayed.

An apparatus for obtaining a call log of a terminal device according to an example of the present disclosure will be illustrated hereinafter. The apparatus for obtaining a call log of a terminal device described below corresponds to the above-described method for obtaining a call log of a terminal device. They can be referred to each other.

Figure 3:
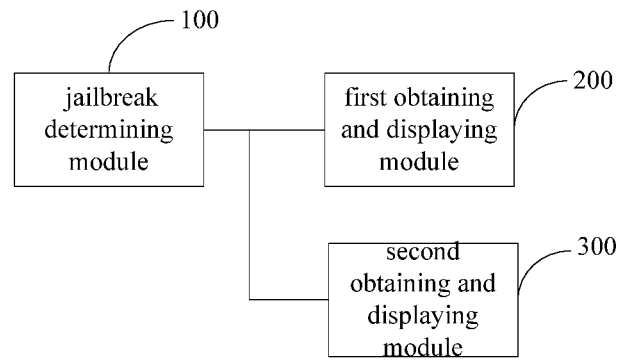
FIG. 3 is a schematic diagram illustrating a structure of an apparatus for obtaining a call log of a terminal device according to an example of the present disclosure.

FIG. 3 is a schematic diagram illustrating a structure of an apparatus for obtaining a call log of a terminal device according to an example of the present disclosure. As shown in FIG. 3, the apparatus includes:

a jailbreak determining module 100, configured to when requesting for call log data of a terminal device, determine whether the terminal device is already in jailbreak;

a first obtaining and displaying module 200, configured to when the terminal device is not in jailbreak, from a call log database corresponding to an application program with a call function, obtain call log data corresponding to the application program, and display the call log data through a UI;

a second obtaining and displaying module 300, configured to when the terminal device is in jailbreak, obtain a full amount of call log data of the terminal device by a service program running background or a hook system interface, and display the full amount of call log data through a UI.

Figure 4:
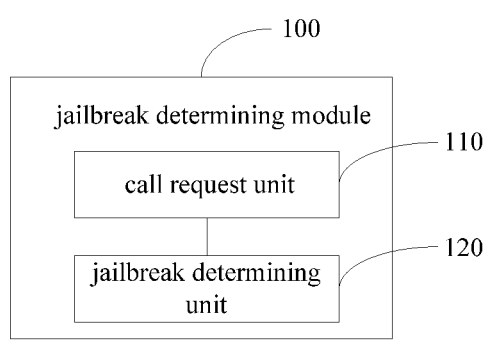
FIG. 4 is a schematic diagram illustrating a structure of a jailbreak determining module according to an example of the present disclosure.

FIG. 4 is a schematic diagram illustrating an optional structure of the jailbreak determining module 100 according to an example of the present disclosure. As shown in FIG. 4, the jailbreak determining module 100 includes:

a call request unit 110, configured to request for call log data from the adaptation layer by the UI layer calling an API provided by the adaptation layer outwards;

a jailbreak determining unit 120, configured to determine by the adaptation layer whether the terminal device is already in jailbreak.

Figure 5:
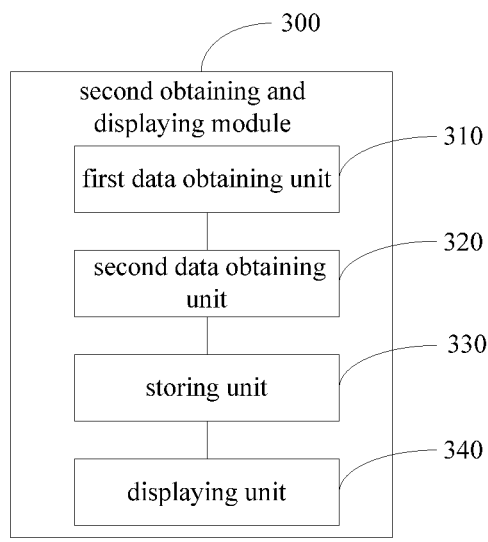
FIG. 5 is a schematic diagram illustrating a structure of a second obtaining and displaying module according to an example of the present disclosure.

FIG. 5 is a schematic diagram illustrating an optional structure of the second obtaining and displaying module 300 according to an example of the present disclosure. As shown in FIG. 5, the second obtaining and displaying module 300 includes:

a first data obtaining unit 310, configured to from a call log database corresponding to an application program with a call function, obtain call log data corresponding to the application program by the adaptation layer;

a second data obtaining unit 320, configured to after obtaining call log data corresponding to the application program, obtain a full amount of call log data of the terminal device by the adaptation layer using a service program running background or a hook system interface;

a storing unit 330, configured to store the full amount of call log data in the call log database;

a displaying unit 340, configured to display the call log data stored in the call log database through a UI.

Figure 6:
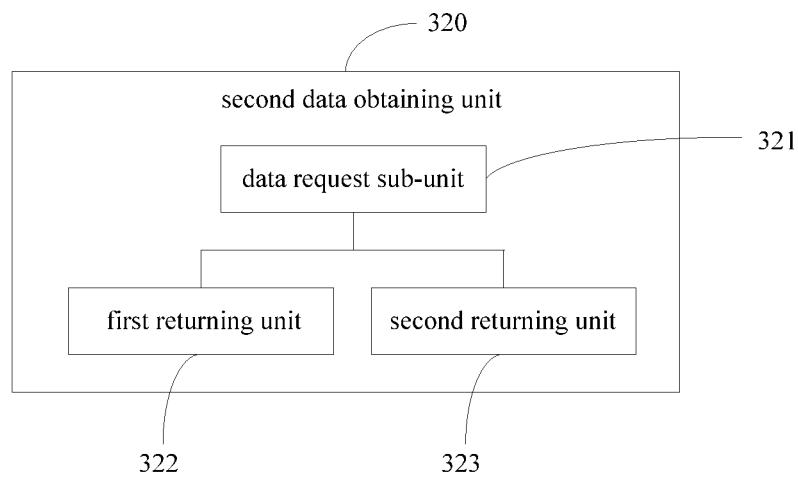
FIG. 6 is a schematic diagram illustrating a structure of a second data obtaining unit according to an example of the present disclosure.

FIG. 6 is a schematic diagram illustrating an optional structure of the second data obtaining unit 320 according to an example of the present disclosure. As shown in FIG. 6, the second data obtaining unit 320 includes:

a data request sub-unit 321, configured to send by the adaptation layer a request for obtaining call log data to the service program running background; the request carries a timestamp corresponding to a previous request;

a first returning unit 322, configured to when the current timestamp of the service program running background is same with the timestamp corresponding to a previous request, return to the adaptation layer an indicator of call log data being unchanged, and not return the call log data to the adaptation layer;

a second returning unit 323, configured to when the current timestamp of the service program running background is different from the timestamp corresponding to a previous request, obtain the full amount of the call log data, and return the current timestamp to the adaptation layer.

Figure 7:
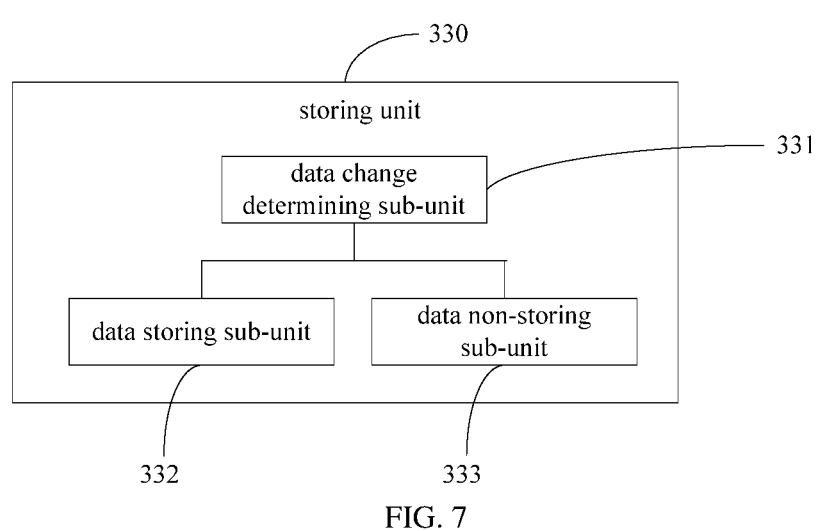
FIG. 7 is a schematic diagram illustrating a structure of a storing unit according to an example of the present disclosure.

FIG. 7 is a schematic diagram illustrating an optional structure of the storing unit 330 according to an example of the present disclosure. As shown in FIG. 7, the storing unit 330 includes:

a data change determining sub-unit 331, configured to determine by the adaptation layer whether the obtained full amount of call log data is changed compared with the full amount of call log data obtained previously;

a data storing sub-unit 332, configured to when it is determined to be "Yes" in the data change determining sub-unit 331, store the full amount of call log data in the call log database;

a data non-storing sub-unit 333, configured to when it is determined to be "No" in the data change determining sub-unit 331, not store the full amount of call log data in the call log database.

According to the apparatus for obtaining a call log of the terminal device provided by the present disclosure, for the non-jailbreak terminal device, from the call log database corresponding to an application program with a call function, the call log data corresponding to the application program is obtained, and the call log data is displayed through the UI layer. For the jailbreak terminal device, by a service program running background or a hook system interface, a full amount of call log data of the terminal device are obtained, and the full amount of call log data are displayed through the UI layer. It can be seen that obtaining the call log data compatible with both the non-jailbreak terminal device and the jailbreak terminal device can be achieved, and the problem that existing methods for obtaining a call log of the terminal device are only applied for the non-jailbreak terminal device and cannot be compatible with both the non-jailbreak terminal device and the jailbreak terminal device for obtaining a call log of the terminal device is solved.

The present disclosure also provides a terminal device, including the above-described apparatus for obtaining a call log of the terminal device, of which the description can be referred to the above, which is not described in detail herein.

A hardware structure of the terminal device according to an example of the present disclosure will be described hereinafter, in which a part related to the method for obtaining a call log of the terminal device may be referred to the above.

Figure 8:
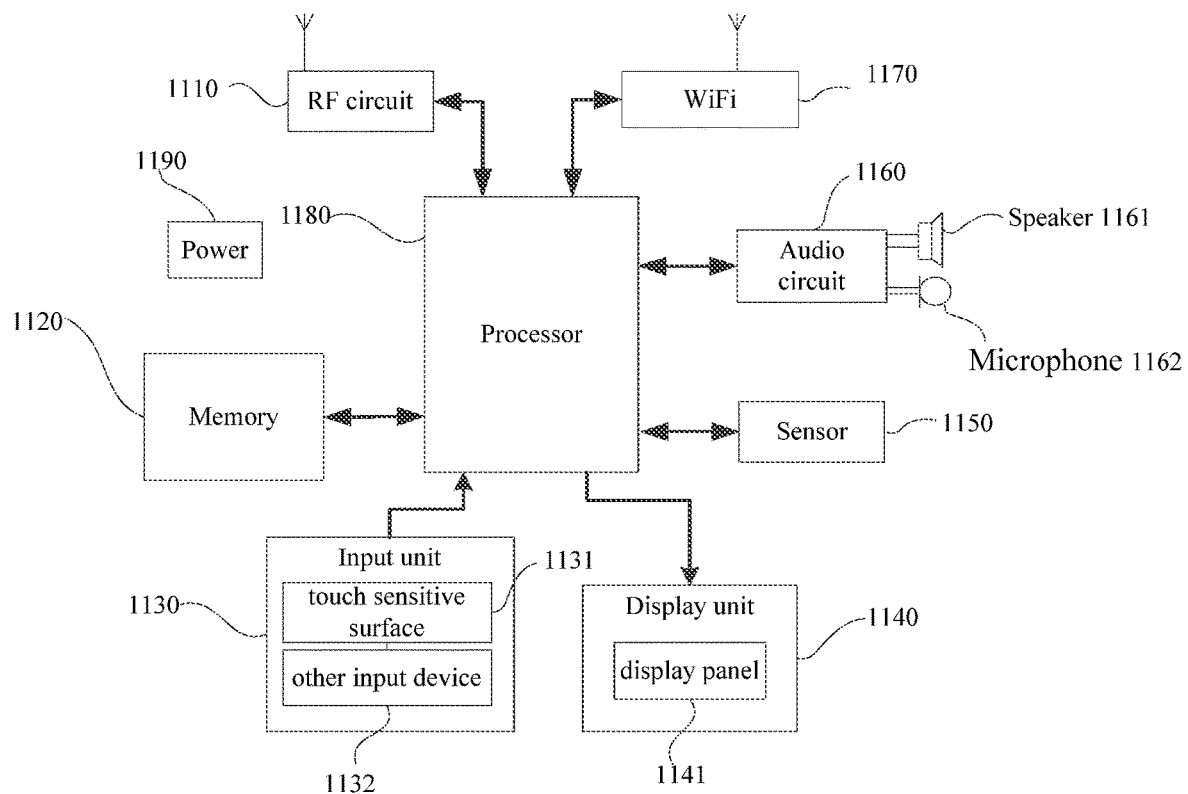
FIG. 8 is a schematic diagram illustrating a part of structure of a mobile phone related to a terminal device according to an example of the present disclosure.

The terminal device provided by examples of the present disclosure may be a mobile phone, a Personal Digital Assistant (PDA), etc. In an example of a terminal device being a mobile phone, FIG. 8 is a schematic diagram illustrating a part of structure of a mobile phone related to a terminal device according to an example of the present disclosure. As shown in FIG. 8, the mobile phone includes a radio frequency (RF) circuit 1110, a memory 1120, an input unit 1130, a display unit 1140, a sensor 1150, an audio circuit 1160, a Wireless Fidelity (WiFi) unit 1170, a processor 1180 and a power supply 1190 and the like. Those skilled in the art may appreciate that, the structure of the mobile phone shown in FIG. 8 is not intended to limit the mobile phone, and may include more or less units than the units shown in FIG. 8, or combinations of some units, or different layout of the units.

The following will describe in detail with reference to units of the mobile phone shown in FIG. 8.

The RF circuit 1110 is capable of sending and receiving signals during an information sending/receiving process or a communication process. In particular, the RF circuit 1110 may send downlink information received from a base station to the processor 1180 for further processing, and may send uplink data to the base station. The RF circuit may generally include, but not limited to, an antenna, at least one amplifier, a transceiver, a coupler, a low noise amplifier (LNA), a duplexer, and the like. Furthermore, the RF circuit 1110 may also perform wireless communications via a network with other devices. The communications may be implemented by any communication standard or protocol including, but not limited to, Global System of Mobile (GSM) communication, General Packet Radio Service (GPRS), Code Division Multiple Access (CDMA), Wideband Code Division Multiple Access (WCDMA), Long Term Evolution (LTE), email, Short Messaging Service (SMS), and so on.

The memory 1120 may store software programs and modules. The processor 1180 runs the software programs and modules stored in the memory 1120 to implement various functions and data processing. The memory 1120 may include an area storing programs and an area storing data. The area storing programs may store an operating system, at least one application program providing a function (e.g., audio playing function, video playing function and so on). The area storing data may store data generated during operation of the mobile phone (e.g., audio data, a phone book, etc.) and so on. In addition, the memory 1120 may include a high-speed random access memory, and may also include a non-transitory memory, e.g., at least one disk storage, flash memory or other non-transitory solid state storage device.

The input unit 1130 may receive the input digits or characters, and generate a keyboard input signal, a mouse input signal, a control lever input signal, an optical input signal, or a track ball input signal which is related with user settings and function controlling of mobile phone 1100. In particular, the input unit 1130 may include a touch sensitive surface 1131 and another input device 1132. The touch sensitive surface 1131, also referred to as a touch screen, is capable of collecting touch operations performed by a user on the surface or near the surface (e.g., an operation performed on or near the touch sensitive surface 1131 by a user using any proper object or attachment such as a finger or a touch pen, etc.), and driving a connecting apparatus corresponding to the operation according to a pre-defined procedure. Optionally, the touch sensitive surface 1131 may include a touch detecting apparatus and a touch controller. The touch detecting apparatus detects the orientation touched by the user, detects a signal generated by the touch, and sends the signal to the touch controller. The touch controller receives touch information from the touch detecting apparatus, converts the touch information into coordinates of the touch point, sends the coordinates to the processor 1180, and receives a command sent by the processor 1180 and executes the command. In addition, the touch sensitive surface 1131 may be implemented via various types of touch techniques such as resistive touch screen, capacitive touch screen, infrared touch screen and surface acoustic wave touch screen and so on. In particular, the input unit 1130 may include another input device 1132 besides the touch sensitive surface 1131. In particular, the input device 1132 may include, but not limited to, at least one of a physical keyboard, a function key (e.g., a volume control key, a power on/off key, etc.), a track ball, a mouse, a control lever and the like.

The display unit 1140 is capable of displaying information input by the user, information provided for the user and various graphical user interfaces of the mobile phone. Optionally, the display unit 1140 may include a display panel 1141. Optionally, the display panel 1141 may be configured by Liquid Crystal Display (LCD), Organic Light-Emitting Diode (OLED) and the like. Further, the touch sensitive surface 1131 may overlay the display panel 1141. When detecting a touch operation on or near the touch sensitive surface 1131, the touch sensitive surface 1131 sends the touch operation to the processor 1180 to determine the type of the touch event, and then the processor 1180 provides a corresponding visual output on the display panel 1141 according to the type of the touch event. Although in FIG. 8, the touch sensitive surface 1131 and the display panel 1141 may be two independent components respectively for input and output, they may also be integrated to provide input and output in some examples.

The mobile phone 1100 may also include at least one sensor 1150, e.g., an optical sensor, a motion sensor, or other types of sensors. In particular, the optical sensor may include an ambient light sensor and a proximity sensor. The ambient light sensor may adjust the brightness of the display panel 1141 according to the strength of ambient light. The proximity sensor may close the display panel 1141 and/or the backlight when the mobile phone is held close to an ear. A gravity sensor is a type of motion sensor, and it may detect the amount of acceleration in multiple directions (typically in three axis), the amount and the direction of gravity when kept in stationary, and can be used in applications which need to identify phone postures (such as auto screen rotation, related games, magnetometer attitude calibration), functions related with vibration identify (such as a pedometer, percussion) and the like. The mobile phone may be configured with other sensors, e.g., a gyroscope, a barometer, a hygrometer, a thermometer, infrared sensors and the like, which are not described in detail herein.

The audio circuit 1160, the speaker 1161 and the microphone 1162 may provide an audio interface between the user and the mobile phone. The audio circuit 1160 may convert received audio data into electrical signals, and then send to the speaker 1161. The speaker 1161 converts the electrical signals into sound and outputs the sound. The microphone 1162 may convert collected sound signals into electrical signals which are received by the audio circuit 1160. The audio circuit 1160 converts the electrical signals into audio data, and sends the electrical signals to the processor 1180 for processing. The processed audio data may be sent to another terminal device via the RF circuit 1110, or output to the memory 1120 for further processing.

WiFi belongs to a short-distance wireless communications technique. The mobile phone may apply a WiFi module 1170 to provide wireless broadband Internet access to enable a user to send and receive emails, browse webpages and access stream media and so on. Although the WiFi module 1170 is shown in FIG. 8, it should be appreciated that it is not intended to be a mandatory module of the mobile phone 1100, and may be omitted based on needs without changing the scope of the present disclosure.

The processor 1180 is a control center of the mobile phone, which interconnects all of the components in the phone using various interfaces and circuits, and monitors the phone completely by running or executing software programs and/or modules stored in the memory 1120, calling the data stored in the memory 1120, and performing various functions of the mobile phone and processing data. Optionally, the processor 1180 may include one or more processing units. Preferably, the processor 1180 may integrate an application processor and a modem processor. The application processor mainly handles the operating system, user interfaces and application programs, etc., and the modem processor mainly handles wireless communications. It should be appreciated that, the modem processor may not be integrated into the processor 1180.

The mobile phone 1100 may also include a power supply 1190 (e.g., a battery) providing power for various components. Preferably, the power supply may be logically connected with the processor 1180 via a power supply management system to implement functions such as charging, discharging, power consumption management and the like.

Although not shown, the mobile terminal 1100 may also include a camera, a Bluetooth module, etc., which are not described in detail herein.

In the examples of the present disclosure, the processor 1180 included in the terminal device may also have the following functions:

when requesting for call log data of a terminal device, determining whether the terminal device is already in jailbreak;

if no, from a call log database corresponding to an application program with a call function, obtaining call log data corresponding to the application program and displaying the call log data through a UI;

if yes, obtaining a full amount of call log data of the terminal device by a service program running background or a hook system interface, and displaying the full amount of call log data through a UI.

Figure 9:
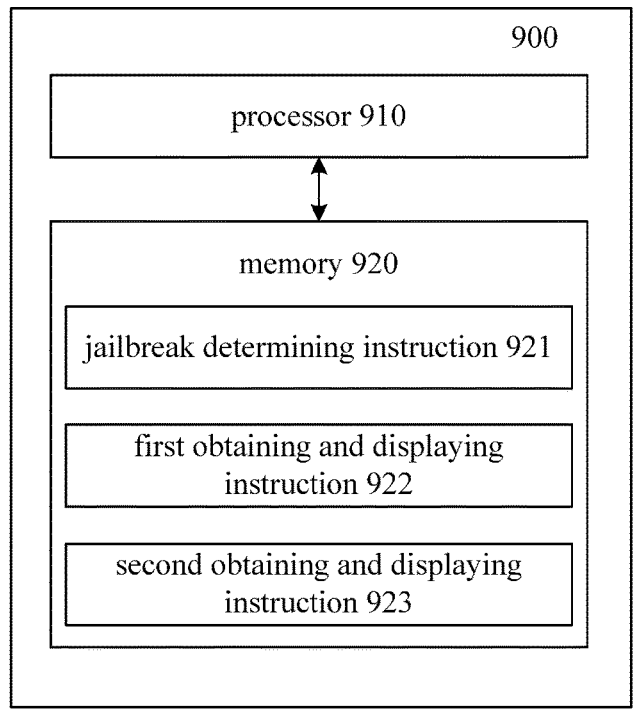
FIG. 9 is a schematic diagram illustrating another structure of a terminal device for obtaining a call log according to an example of the present disclosure.

FIG. 9 is a schematic diagram illustrating another structure of a terminal device for obtaining a call log according to an example of the present disclosure.

As shown in FIG. 9, the terminal device 900 may include a memory 920, and a processor 910 in communication with memory 920. Memory 920 may store the following instructions executable by processor 910, which are a jailbreak determining instruction 921, a first obtaining and displaying instruction 922, and a second obtaining and displaying instruction 923.

The jailbreak determining instruction 921 may indicate to when requesting for call log data of a terminal device, determine whether the terminal device is already in jailbreak.

The first obtaining and displaying instruction 922 may indicate to when the terminal device is not in jailbreak, from a call log database corresponding to an application program with a call function, obtain call log data corresponding to the application program, and display the call log data through a User Interface (UI).

The second obtaining and displaying instruction 923 may indicate to when the terminal device is in jailbreak, obtain a full amount of call log data of the terminal device by a service program running background or a hook system interface, and display the full amount of call log data through a UI.

The examples of the present disclosure are described in progression. Description of each example focuses on the difference from other examples. The same or similar part among examples may be referred to each other. For the apparatus according to an example of the present disclosure, which corresponds to the method according to an example of the present disclosure, the description about the apparatus is simplified, and the relevant part may refer to the description about the method.

Those skilled in the art may further appreciate that modules and steps according to each example of the present disclosure can be implemented by electronic hardware, computer software or both. In order to clearly describe the interchangeability between hardware and software, the structure or steps of each example are described in general according to functions in the above description. Whether those functions are executed by hardware or software depends on specific applications and design constraints of technical solutions. Those skilled in the art my use different methods for each specific application to implement the described function, but this implementation cannot be construed to exceed the scope of the present disclosure.

The methods and devices provided by examples of the present disclosure may be achieved by hardware, or software modules executed by the processor, or combination thereof. The software modules may be stored in a Random Access Memory (RAM), an internal storage, a Read Only Memory (ROM), an electronically programmable ROM, an electronically erasable programmable ROM, a register, a hard disk, a removable disk, a Compact Disc-ROM (CD-ROM), or any other kinds of storage mediums which are well known for those skilled in the art.

The aforementioned description of examples of the present disclosure can be implemented or used by those skilled in the art. Any modifications on those examples will be obvious to those skilled in the art. The general principle defined herein may be implemented in other examples without departing from the spirit and principle of the present disclosure. Hence, the present disclosure will not be limited to those examples described herein, and conform to most wide scope corresponding to the principle and novelty disclosed by the present disclosure.

What is claimed is:

1. A method for obtaining a call log of a terminal device, comprising:
   requesting call log data of a terminal device from an adaptation layer by a UI layer calling an Application Programming Interface (API) provided by the adaptation layer;
   in response to requesting the call log data of the terminal device, determining from the adaptation layer if the terminal device is in jailbreak;
   if the terminal device is not in jailbreak, obtaining call log data corresponding to the application program from a call log database corresponding to an application program with a call function, and displaying the call log data through a User Interface (UI); and
   if the terminal device is in jailbreak, obtaining a full amount of call log data of the terminal device by a service program running background or a hook system interface, and displaying the full amount of call log data stored in the database through a UI;
   wherein the full amount of call log data of the terminal device is stored in and obtained from the call log database corresponding to the application program with the call function;
   wherein after obtaining the call log data corresponding to the application program, obtaining the full amount of call log data of the terminal device by the adaptation layer using the service program running background or the hook system interface; and
   wherein displaying the full amount of call log data through a UI comprises
   displaying the call log data stored in the call log database through a UI.

2. The method according to claim 1, wherein obtaining the full amount of call log data of the terminal device by the adaptation layer using the service program running background comprises:
   sending by the adaptation layer a request for obtaining call log data to the service program running background; wherein the request includes a timestamp corresponding to a previous request;
   if a current timestamp of the service program running background is the same as the timestamp corresponding to the previous request, returning to the adaptation layer an indicator of call log data being unchanged; and
   if a current timestamp of the service program running background is different from the timestamp corresponding to the previous request, obtaining the full amount of call log data, and returning the current timestamp to the adaptation layer.

3. The method according to claim 2, wherein storing the full amount of call log data in the call log database comprises:
   determining by the adaptation layer whether the full amount of call log data is changed compared with a full amount of call log data obtained previously; and
   if the full amount of call log data is changed, storing the full amount of call log data in the call log database.

4. An apparatus for obtaining a call log of a terminal device, comprising:
   a jailbreak determining module configured to, in response to requesting for call log data of a terminal device, determine whether the terminal device is in jailbreak;
   a first obtaining and displaying module configured to, if the terminal device is not in jailbreak, obtain call log data corresponding to an application program from a call log database using a call function, and display the call log data through a User Interface (UI); and;
   a second obtaining and displaying module configured to, if the terminal device is in jailbreak, obtain a full amount of call log data of the terminal device using a service program running background or a hook system interface, and display the full amount of call log data through a UI;
   wherein the jailbreak determining module comprises:
     a call request unit configured to request the call log data from an adaptation layer by a UI layer calling an Application Programming Interface (API) provided by the adaptation layer; and
     a jailbreak determining unit configured to determine by the adaptation layer whether the terminal device is in jailbreak; and
   wherein the second obtaining and displaying module comprises:
     a first data obtaining unit configured to obtain by the adaptation layer the call log data corresponding the application program from the call log database corresponding to the application program with the call function;
     a second data obtaining unit configured to, after obtaining the call log data corresponding to the application program, obtain the full amount of call log data of the terminal device by the adaptation layer using the service program running background or the hook system interface;

a storing unit configured to store the full amount of call log data in the call log database; and;

a displaying unit configured to display the call log data stored in the call log database through a UI.

5. The apparatus according to claim 4, wherein the second data obtaining unit comprises:

a data request sub-unit configured to send by the adaptation layer a request for obtaining call log data to a service program running background, wherein the request includes a timestamp corresponding to a previous request;

a first returning unit configured to, if a current timestamp of the service program running background is the same as the timestamp corresponding to the previous request, return to the adaptation layer an indicator of call log data being unchanged; and a second returning unit, configured to, if a current timestamp of the service program running background is different from the timestamp corresponding to the previous request, obtain the full amount of call log data, and return the current timestamp to the adaptation layer.

6. The apparatus according to claim 4, wherein the storing unit comprises:

a data change determining sub-unit configured to determine by the adaptation layer whether the obtained full amount of call log data is different from a full amount of call log data obtained previously;

a data storing sub-unit configured to, if the full amount of call log data is different, store the full amount of call log data in the call log database.

* * * * *